United States Patent [19]

Bertram et al.

[11] Patent Number: 5,426,139
[45] Date of Patent: Jun. 20, 1995

[54] GRAFT COPOLYMER COATING COMPOSITIONS

[75] Inventors: James L. Bertram; Zeng K. Liao; Lloyd A. McCrary, all of Lake Jackson, Tex.

[73] Assignee: The Dow Chemical Company, Midland, Mich.

[21] Appl. No.: 248,797

[22] Filed: May 25, 1994

[51] Int. Cl.$^6$ .............................................. C08L 71/02
[52] U.S. Cl. ...................................... 523/436; 528/91; 528/103; 528/405
[58] Field of Search .................. 523/436; 528/91, 103, 528/405

[56] References Cited

U.S. PATENT DOCUMENTS

| | | |
|---|---|---|
| 3,544,655 | 12/1970 | Booth et al. . |
| 4,212,781 | 7/1980 | Evans et al. . |
| 4,284,574 | 8/1981 | Bagga . |
| 4,374,875 | 2/1983 | Fan . |
| 4,399,241 | 8/1983 | Ting et al. . |
| 4,443,568 | 4/1984 | Woo . |
| 4,450,304 | 5/1984 | Diery et al. . |
| 4,482,671 | 11/1984 | Woo et al. . |
| 4,540,742 | 9/1985 | Okamoto ............................ 525/523 |
| 4,638,038 | 1/1987 | Salensky . |

FOREIGN PATENT DOCUMENTS 361519  9/1989  European Pat. Off. .

OTHER PUBLICATIONS

Massingill, John L., "Resin Modifications Lower Epoxy Coatings VOCs," *Modern Paint and Coatings*, pp. 48–56, 1987.

*Primary Examiner*—Melvyn I. Marquis
*Assistant Examiner*—D. Aylward

[57] ABSTRACT

Graft copolymers containing:
  (1) a phenolic resin; and
  (2) a poly(alkylene oxide) chain pendant to the phenolic resin, selected such that the graft copolymer has a solubility of no more than about 10 g/L in water, are taught. The graft copolymers are useful in coatings compositions with a curing agent, a solvent, and optionally an epoxy resin. The curable compositions have improved flexibility and/or solvent resistance. They are particularly useful in can coatings.

20 Claims, No Drawings

GRAFT COPOLYMER COATING COMPOSITIONS

BACKGROUND OF THE INVENTION

The present invention relates to the art of coating compositions, particularly those used in coating food and beverage cans.

The inside of food and beverage cans is commonly coated with an epoxy based resin in order to prevent chemical reaction between the metal in the can and chemicals in the food or beverage. The coating is usually applied to and cured on metal sheets, which are cut and shaped to form the can. The can is subsequently filled and sealed. The coating needs to be flexible, so that it can withstand the shaping process without cracking. It needs to be stable for long periods in contact with aqueous and organic materials in food.

Coating compositions are needed that have improved flexibility, and high resistance to contact with water and organic solvents.

SUMMARY OF THE INVENTION

One aspect of the present invention is a graft copolymer comprising:
  (1) a phenolic resin; and
  (2) a poly(alkylene oxide) chain pendant from the phenolic resin,
selected such that the graft copolymer has a solubility of no more than about 10 g/L in water. The term "chain" refers to an oligomer, polymer, or copolymer.

A second aspect of the present invention is a twice-grafted copolymer that comprises:
  (1) a phenolic resin; and
  (2) a poly(alkylene oxide) chain pendant to the phenolic resin,
  (3) a poly(unsaturated acid) chain pendant either to the phenolic resin, or to the poly(alkylene oxide) chain, or to both.

A third aspect of the present invention is a water-dispersible resin comprising the twice-grafted copolymer previously described and further comprising:
  (4) volatile base moieties associated with at least some acid moieties in the twice-grafted copolymer.

A fourth aspect of the present invention is a coating composition that comprises:
  (1) a copolymer or resin, as previously described;
  (2) a curing agent that can react with the copolymer or resin; and
  (3) an aqueous or organic solvent or dispersant.

A fifth aspect of the present invention is a process to use the coating composition comprising the steps of:
  (1) applying the composition to a metal substrate; and
  (2) curing the composition.

The graft copolymers and twice-grafted copolymers of the present invention can be used to make coatings with a good balance of properties, such as flexibility, water-resistance and solvent resistance, for use in food and beverage cans.

DETAILED DESCRIPTION OF THE INVENTION (A) Graft Copolymers

The present invention uses a phenolic resin. Phenolic resins and processes to make them are well known and are described in many literature references, such as: Diery, U.S. Pat. No. 4,450,304 (May 22, 1984); Fan, U.S. Pat. No. 4,374,875 (Feb. 22, 1983); Salensky, U.S. Pat. No. 4,638,038 (Jan. 20, 1987); Brennan et al., U.S. Pat. No. 5,218,075 (Jun. 8, 1993) and 6 *Encyclopedia of Polymer Sci. & Eng., "Epoxy Resins"* at 331 (J. Wiley & Sons 1986), which are incorporated herein by reference.

The phenolic resin is preferably essentially unbranched. It more preferably results from the reaction of excess dihydric phenol with the diglycidyl ether of a dihydric phenol. (For the purpose of this application, a dihydric phenol is a compound having on average about 2 phenolic hydroxyl groups, which are not necessarily bonded to the same aromatic ring). Examples of suitable dihydric phenols include resorcinol, hydroquinone, 4,4'-dihydroxybiphenyl, bis-(4-hydroxyphenyl)methane (bisphenol F), 2,2-bis-(4-hydroxyphenyl)propane (bisphenol A), bis-(4-hydroxyphenyl)sulphone, bis-(4-hydroxyphenyl)ketone, bis-(4-hydroxyphenyl)fluorene and alkyl- or halo-substituted variations thereof. The advancement reaction usually takes place in the presence of a suitable catalyst, such as a quaternary ammonium or phosphonium salt.

The phenolic resin preferably is represented by Formula (1):

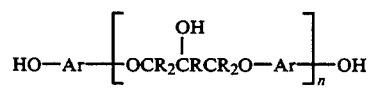

Formula I wherein:
  Each Ar represents an aromatic ring or a moiety containing two fused or unfused aromatic rings. The aromatic rings are preferably carbocyclic. They may have substituents that do not interfere with the manufacture or use of the resin, such as lower ($C_1$ to $C_6$) alkyl groups, halogen atoms, alkoxy groups and the like, but they are preferably unsubstituted. Unfused rings may be linked by a bond or by a divalent moiety that does not interfere with the manufacture or use of the resin. Examples of divalent moieties include an oxygen atom, a sulfur atom, a lower hydrocarbyl group, a halogenated lower hydrocarbyl group, a sulfone group, a ketone group, a fluorene group and the like. The divalent moiety is preferably a methylene or isopropylene moiety, and is most preferably isopropylene.

Each R represents a hydrogen atom, a halogen or a lower alkyl group. Each R is preferably hydrogen.

"n" represents an average number of repeating units that is greater than 0. "n" is preferably at least about 1 on average, and more preferably at least about 2 on average. "n" is preferably no more than about 200 on average and more preferably no more than about 100 on average.

The weight average molecular weight of the phenolic resin is preferably at least about 1000 and more preferably at least about 4000. The weight average molecular weight is preferably no more than about 50,000 and more preferably no more than about 20,000. Phenolic resins preferably contain at least about 1000 ppm of phenolic OH, and more preferably at least about 2500 ppm. They preferably contain no more than about 30,000 ppm, and more preferably no more than about 15,000 ppm.

The phenolic resin is contacted with an alkylene oxide monomer and an acidic or basic catalyst in order to form a grafted copolymer having pendant poly(alkylene oxide) chains. A related process has been described in Diery et al., U.S. Pat. No. 4,450,204 (May 22, 1984), which is incorporated herein by reference.

The alkylene moiety in the alkylene oxide preferably contains on average no more than about 30 carbon atoms, more preferably no more than about 8 carbon atoms, more highly preferably no more than about 6 carbon atoms, and most preferably no more than about 4 carbon atoms. The alkylene moiety contains on average at least 2 carbon atoms, and preferably contains on average at least 3 carbon atoms. It may be cyclic or non-cyclic. It may contain heteroatoms, unsaturated moieties and substituents that do not interfere with the manufacture and use of the graft copolymer (such as vinyl, alkoxide, aryloxide, and halogen moieties), but it preferably does not. Examples of suitable alkylene oxide monomers include: ethylene oxide, propylene oxide, 1,2-butylene oxide, epichlorohydrin, cyclohexene oxide, norborylene oxide, and the like. The alkylene oxide is preferably propylene oxide or 1,2-butylene oxide.

The weight ratio of alkylene oxide to phenolic resin is preferably at least about 5 percent and more preferably at least about 10 percent. It is preferably at most about 50 percent and more preferably at most about 30 percent.

The basic catalyst should be capable of removing hydrogen from secondary alkyl hydroxyl groups and phenolic hydroxy groups (if any) within the phenolic resin. Examples of suitable basic catalysts include alkali metal hydroxides, an alkali metal alkoxides, alkali metal hydrides and the like. The catalyst is preferably an alkali metal alkoxide. The acidic catalyst is preferably capable of initiating ring opening of the alkylene oxide ring. Examples of suitable acidic catalysts include boron trifluoride etherate, stannic chloride, stannous chloride or zinc chloride. The catalyst is preferably a basic catalyst. The equivalent ratio of catalyst to secondary hydroxyl groups on the phenolic resin is preferably at least about 1 percent and more preferably at least about 5 percent. It is preferably at most about 20 percent and more preferably at most about 10 percent.

The reaction is preferably carried out in an aprotic solvent, such as xylene, toluene, tetrahydrofuran, dimethoxyethane, dimethoxyethylether, DMSO and the like. If a nonpolar solvent is used, then the catalyst is preferably dissolved in a polar solvent before it is added to the reaction mixture. The temperature is not critical, as long as the reagents remain liquid in solution. The temperature is preferably about $-20°$ C. to $150°$ C. When an acidic catalyst is used, the temperature is more preferably from about $-20°$ C. to $100°$ C. When a basic catalyst is used, the temperature is more preferably from about $50°$ C. to $150°$ C. The pressure is not critical, as long as the reagents remain liquid, it may be atmospheric, subatmospheric or super-atmospheric. The pressure is preferably about atmospheric pressure.

The resulting graft copolymer has poly(alkylene oxide) chains bonded to both the secondary hydroxyl groups and the terminal phenolic or epoxy groups. It is preferably represented by Formula 2:

"m" represents an average number of repeating units of alkylene oxide. Each alkylene oxide chain preferably contains on average less than 8 repeating units, more preferably no more than 6 repeating units, and most preferably no more than about 4 repeating units. Each alkylene oxide chain contains on average at least one repeating unit, and preferably at least 2 repeating units.

"a" represents a proportion of phenolic repeating units that contain a pendant chain, and "b" represents a proportion of phenolic repeating units that do not. The graft copolymer should contain at least some pendant polymer, so that "a" should average greater than 0. "b" may optionally be 0, but it is preferably greater than 0 (indicating that the graft copolymer contains at least some ungrafted hydroxyl groups attached to the backbone). More preferably, about 1 to 50 percent of the hydroxyl groups are ungrafted ("a" equals about 0.5 to 0.99, and "b" equals about 0.01 to 0.5). Most preferably, about 10 to 30 percent of the hydroxyl groups are ungrafted ("a" equals about 0.7 to 0.9, and "b" equals about 0.1 to 0.3).

All other characters have the meanings previously assigned.

The monomers, poly(alkylene oxide) chain length and number of poly(alkylene oxide) chains are preferably selected so that the graft copolymer is not water-soluble or water-dispersible. The solubility of the graft copolymer in water at $25°$ C. is preferably no more than about 10 g/L, more preferably no more than about 5 g/L, and most preferably no more than about 1 g/L. It may be as low as about 0 g/L. The water-extracted content of the resin is preferably no more than about 35 weight percent, highly preferably no more than about 25 weight percent, more highly preferably no more than about 10 weight percent, and most preferably no more than about 5 weight percent. The graft copolymer preferably contains no more than about 50 weight percent poly(alkylene oxide), and more preferably no more than about 30 weight percent. It preferably contains at least about 5 weight percent poly(alkylene oxide), and more preferably at least about 10 percent.

The copolymer preferably has a glass-transition temperature of at least about $-30°$ C. and more preferably at least about $-20°$ C. The copolymer preferably has a glass-transition temperature of at most about $60°$ C. and more preferably at most about $50°$ C.

The graft copolymer can be used without further grafting in curable compositions that are dissolved or dispersed in an organic solvent. Alternatively, it can be converted into a water-dispersible twice-grafted copolymer for use in aqueous coating compositions.

(B) Twice-Grafted Copolymers

Graft copolymers of the present invention can be made water-dispersible by known methods, such as: (1) reacting with an unsaturated acidic monomer to form a pendant acidic polymer or copolymer and (2) reacting the acidic polymer or copolymer with volatile base Formula 2

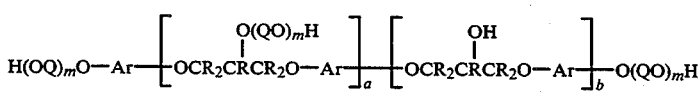

wherein:
  Each Q individually represents an alkylene moiety as previously described.

moieties to form quaternary salts which make the polymer water-dispersible.

Acidic polymers, suitable monomers for making them and polymerization conditions are described in Ting, U.S. Pat. No. 4,285,847 (Aug. 25, 1981); Evans et al., U.S. Pat. No. 4,308,185 (Dec. 29, 1981); Ting, U.S. Pat. No. 4,399,241 (Aug. 16, 1983); Woo, U.S. Pat. No. 4,443,568 (Apr. 17, 1984); Salensky, U.S. Pat. No. 4,638,038 (Jan. 20, 1987); Fan, U.S. Pat. No. 4,374,875 (Feb. 22, 1983); and Tess, "Epoxy Resin Coatings", *Epoxy Resins* (2d Ed.) at 766–772 (Marcel Dekker, Inc. 1988), which are incorporated herein by reference. Examples of suitable unsaturated acid monomers include acrylic acid and methacrylic acid. The unsaturated acid is most preferably methacrylic acid. The acid monomers may optionally be copolymerized with unsaturated comonomers, such as ethylene, propylene, butylene, styrene, methylacrylate, ethylacrylate, butylacrylate, 2-ethylhexalacrylate, hydroxyethylacrylate, or 2-hydroxybutylacrylate. The comonomer is most preferably styrene.

The unsaturated monomers preferably make up at least about 5 percent of the total weight of unsaturated monomers and graft copolymer, more preferably at least about 10 percent, and most preferably at least about 15 percent. The weight percentage of unsaturated monomers is preferably no more than about 40 percent, more preferably no more than about 30 percent and most preferably no more than about 25 percent. The unsaturated acid monomers preferably make up about 40 to 90 weight percent of all unsaturated monomers, more preferably about 50 to 80 weight percent, and most preferably about 60 to 70 weight percent.

The reaction is initiated by a free radical initiator, which is usually a peroxide or an azo compound. Examples of suitable initiators include t-butylperbenzoate, di-t-butylperoxide, t-butylhydroperoxide azo-bis-isobutyronitrile, and bisbenzoyl peroxide. The mixture preferably contains at least about 0.5 parts initiator per 100 parts unsaturated monomers and more preferably at least about 1 parts per hundred. The mixture preferably contains no more than about 10 parts initiator per 100 parts unsaturated monomer, and more preferably no more than about 5 parts initiator.

The reaction preferably takes place in an organic solvent such as n-butanol and/or butoxyethanol. The temperature of the reaction is preferably at least about 50° C. and more preferably at least about 100° C.; it is preferably no more than about 200° C. and more preferably no more than about 150° C.

The resulting composition contains a mixture of species. Usually, it contains at least some phenolic resin having pendant poly(alkylene oxide) polymer but no poly(unsaturated acid) polymer pendant thereto ("graft copolymer"). The composition also contains some graft copolymer in which the poly(unsaturated acid) polymer or copolymer is chemically linked to the graft copolymer. (This polymer is hereinafter referred to as "twice-grafted" copolymer.) It also contains other species of homopolymers, copolymers and graft copolymers. (The terms "graft" and "grafted" mean that the polymer chain referred to is pendant from another polymer chain, but do not suggest the mechanism by which the pendant chain is made. The "grafted" chain may be grown pendant by reacting monomers with a reactive site on the primary polymer chain, or it may be formed in a separate reaction and then attached to the primary chain. ) The composition preferably contains at least about 40 weight percent twice-grafted copolymer and more preferably contains at least about 70 weight percent.

The composition is preferably not appreciably water-dispersible in its free-acidic state. The composition is contacted with a base to render it water-dispersible. The base is preferably a Lewis base, more preferably an amine, and most preferably a tertiary amine or ammonia. The base can preferably be volatilized and removed from the carboxylic acid at a temperature of no more than about 200° C. and more preferably at a temperature of no more than about 180° C. The base is preferably stably associated with the carboxylic acid up to temperatures of at least about 100° C. Examples of suitable bases include dimethylethanolamine, methyldiethanolamine and triethanolamine. The water-dispersible composition can be made either by: (1) reacting the twice-grafted polymer with the base and then dissolving it in water; or (2) by dissolving the twice-grafted copolymer in a mixture of water and base. The resulting composition contains the twice-grafted copolymer in which at least about 50 equivalent percent of the acid moieties are associated with base, more preferably at least about 70 percent and most preferably at least about 80 percent.

(C) Coating Compositions and Their Use

The graft copolymers and twice-grafted copolymers of the present invention can be used in coating compositions of the present invention. The coating compositions comprise:

(1) a copolymer or resin, as previously described;
(2) either an epoxy resin or a curing agent or both; and
(3) an aqueous or organic solvent or dispersant.

The copolymer or resin is a graft or twice-grafted copolymer with the description and preferred embodiments previously given.

The coating composition preferably further contains an epoxy resin. The epoxy resin may be any compound containing one or more epoxy groups per molecule that is suitable for use in coating compositions. The epoxy resin preferably contains on average at least about 2 epoxy groups per molecule. The epoxy resin is preferably a glycidyl ether of a polyol containing two or more aliphatic or phenolic hydroxyl groups per molecule. It is more preferably a glycidyl ether of a biphenol, bisphenol or polyphenol resin (such as a novolac, a trisphenol and the like).

The epoxy resin preferably has an epoxy equivalent weight (EEW) of at least about 2000, and more preferably at least about 3000. Its EEW is preferably at most about 6000, and more preferably at most about 5000. The number average molecular weight of the epoxy resin is preferably at least about 7000, and more preferably at least about 10,000. Examples of suitable epoxy resins and processes to make them are described in columns 18–23 of Bertram et al., U.S. Pat. No. 5,169,473 (Dec. 8, 1992), which is incorporated herein by reference. Suitable epoxy resins are also commercially available. (EEW and methods to measure it are described in H. Lee & K. Neville, *Handbook of Epoxy Resins* at 4–15 to 4–21 (McGraw-Hill Book Co. 1967), which is incorporated herein by reference.)

When the coating composition is an aqueous composition, then the epoxy resin is preferably water-dispersible. The epoxy resins can be made water-dispersible as previously described. Examples of suitable water-dispersible epoxy resins and processes to make them are also described in Ting, U.S. Pat. No. 4,285,847 (Aug. 25, 1981); Evans et al., U.S. Pat. No. 4,308,185 (Dec. 29, 1981); and Tess, "Epoxy Resin Coatings", *Epoxy Resins* (2d Ed.) at 766-772 (Marcel Dekker, Inc. 1988), which are incorporated herein by reference. Suitable water-dispersible resins are also commercially available.

The weight ratio of advanced epoxy resin to graft copolymer or twice-grafted copolymer is preferably between 0:100 and 99:1. It is more preferably between 25:75 and 75:25. (When the epoxy resin is used as a cross-linker in concentrations below 25:75, then the epoxy resin preferably has a lower EEW than the resins previously described. Its EEW is preferably at least about 170.)

The coating composition preferably also contains a curing agent. The curing agent preferably reacts to cure with the hydroxyl groups on graft copolymer or with the hydroxyl groups and/or acid groups on the twice-grafted copolymer. Examples of suitable curing agents include poly(isocyanates), anhydrides, urea-formaldehyde resins, melamine-formaldehyde resins, and phenol-formaldehyde resins. The weight ratio of curing agent to graft copolymer or twice-grafted copolymer is preferably between about 1:100 and about 50:100, more preferably between about 5:100 and about 25:100, and most preferably between about 10:100 and about 15:100.

The coating composition preferably further comprises a catalytic amount of catalyst for the reaction between the curing agent and the graft copolymer or twice-grafted copolymer. Examples of suitable catalysts include phosphoric acid. The concentration of catalyst is preferably between 0.1 and 5 parts catalyst per 100 parts solids, by weight.

The coating composition may optionally contain other additives, such as fillers, pigments, stabilizers and flow-modifiers. Stabilizers, flow-modifiers and the like preferably make up about 0-5 weight percent of the composition. Pigments and fillers preferably make up 0-65 weight percent of the composition.

The coating composition also contains an aqueous or organic solvent. The solvent is selected so that it can dissolve or disperse the solid components of the system. Examples of suitable organic solvents include: ketones such as cyclohexanone and glycol ethers such as 1-methoxypropanol or butoxyethanol. Aqueous solvents may optionally contain a minor portion of organic solvent to assist in dispersing the solid components. The aqueous solvent preferably contains between about 5 and about 20 weight percent organic solvent.

The composition can be used according to the ordinary methods for making and using curable coating compositions. It is applied to a substrate by ordinary means, such as spraying, brushing or rolling. The composition is then heated to remove the solvent and volatile base moieties (if any), and to cure the composition. The substrate is preferably metal, and more preferably a metal sheet suitable for use in food or beverage cans. The curing step is preferably carried out at at least about 120° C. and more preferably at least about 150° C. The temperature is preferably at most about 200° C. The time needed to cure varies depending upon the composition and the temperature of curing, but it is usually between about 5 min. and 60 min. under preferred conditions.

The compositions of the present invention have a good combination of flexibility and solvent resistance. The wedge bend test results for sheets coated with the composition are preferably no more than about 20 mm, more preferably no more than about 10 mm and most preferably no more than about 5 mm. The MEK rub test results are preferably at least about 10. The composition may also have additional advantages. The copolymers preferably have a lower glass-transition temperature than ordinary water-dispersible grafted copolymer resins. The lower glass-transition temperature means that the resin flows and consolidates better before curing, so that it closes flaws and pinholes in the coating better. Additionally, some preferred resins may disperse better in the aqueous dispersant, so that less volatile organic solvent is needed to maintain the twice-grafted copolymer in dispersion.

ILLUSTRATIVE EXAMPLES

The following examples are for illustrative purposes only. They should not be taken as limiting either the specifications or claims. Unless otherwise stated, all parts and percentages are by weight.

Example 1—Poly(Propylene Oxide)-graft-Phenolic Resin

A phenolic resin is made by reacting 334.58 g of diglycidyl ether of bisphenol A (EEW=180.60) with 245.56 g of bisphenol A at 175° C. for 2 hours under nitrogen atmosphere in the presence of 0.829 g of mixture containing 70 percent ethyltriphenylphosphonium acetate/acetic acid complex dissolved in methanol. The resulting phenolic resin has a phenolic hydroxyl content of 9978 ppm, a hydroxyl content of 5.38 percent, a number average molecular weight of about 4850, and a weight average molecular weight of about 11,000.

A mixture that contains:
1.46 g potassium t-butoxide;
50 g phenolic resin from the previous paragraph; and
28.1 g propylene oxide
is heated under nitrogen atmosphere in a glass autoclave for 16 hours at 120° C. to 125° C., and then cooled to room temperature. A 500 mL solution of 50 percent methyl ethyl ketone and 50 percent toluene is added to the reaction mixture. The reaction mixture is neutralized with magnesium silicate, filtered, and washed 5 times with 100 mL of water each time. Solvent is stripped off at less than 175° C. and less than 10 mmHg pressure, and 70 g of viscous resin is recovered having hydroxyl content of about 4.4 percent. The resin has a viscosity of 3560 cps at 150° C. measured with an ICI cone-plate viscometer. Carbon 13 NMR analysis shows that the carbon atom attached to the secondary hydroxyl group is shifted from 68 ppm to 78 ppm, indicating that grafting has occurred at the secondary hydroxyl group. The hydroxyl content of the resin is measured by titration and is shown in Table 1.

The process is repeated two more times. The results are set out in Table 1:

TABLE 1

| Sample No. | KOBu (g) | Phenolic (g) | PO (g) | OH content (%) | Viscosity (cps) |
|---|---|---|---|---|---|
| 1 | 1.46 | 50 | 28.1 | 4.42 | 43,850 |
| 2 | 1.46 | 50 | 46.7 | 3.60 | 2560 |
| 3 | 1.74 | 40 | 52.4 | 3.20 | 560 |

Viscosity is measured with ICI cone & plate viscometer at 100° C.

Example 2—Poly(Propylene Oxide)-graft-Phenolic Resin

Made by Solution Process

The process of Example 1 is repeated, except that the reaction mixture also contains a solvent. The reagents and products are reflected in Table 2. Carbon-13 analysis of the resulting resin shows that grafting has occurred on the secondary hydroxyl groups.

TABLE 2

| No. | KOBu (g) | Phenolic (g) | PO (g) | Solvent | Solvent (g) | OH content (%) | viscosity (cps) |
|---|---|---|---|---|---|---|---|
| 4 | 1.64 | 75 | 37.4 | 2-methoxy ethyl ether | 38 | 3.87 | 64,100 |
| 5 | 0.89 | 40 | 37.4 | 2-methoxy ethyl ether | 20 | 3.82 | 6370 |
| 6 | 0.67 | 30 | 28.2 | 2-methoxy ethyl ether | 15 | 3.56 | 6025 |
| 7 | 0.89 | 40 | 37.4 | xylene | 20 | 3.81 | 7770 |

Viscosity is measured with ICI cone & plate viscometer at 100° C.

Example 3—Nonylphenol-Capped Poly(Propylene Oxide)-graft-Phenolic Resin

An advanced end-capped phenolic resin is made as described in Example 1 using 391.8 g of diglycidyl ether of bisphenol A, 208.88 g of bisphenol A, 73.56 g nonylphenol end-capping agent and 0.829 g of catalyst from Example 1. The resulting advanced resin has a viscosity of 3930 cps at 200° C. It has a hydroxyl equivalent weight of 315 and a hydroxyl content of 5.39.

A graft copolymer is made by reacting 50 g of the advanced resin, 2.25 g of potassium t-butoxide, 46.7 g of propylene oxide, as described in Example 1. The resulting resin has a hydroxyl content of 3.35 percent and a viscosity of 1490 cps at 100° C.

Example 4—Curable Compositions and Properties

A graft copolymer has a phenolic resin backbone and pendant poly(propylene oxide) groups made by the process in Example 1 using the propylene oxide charge shown in Table 3. The graft copolymer is mixed with a solvent mixture containing 80 percent 2-butoxyethanol and 20 percent cyclohexanone until the mixture had a Gardener G viscosity. A curing agent (METHYLON 75108 monomeric allylated phenol/formaldehyde/methanol resole sold by Occidental Chemical Co.) is added as a 50 percent mixture with the solvent mixture to reach the concentration shown in Table 3. An epoxy resin (D.E.R. ® 669 from The Dow Chemical Company) is added in the quantity shown in Table 3. About 10 g of a mixture containing about 85 percent phosphoric acid and about DOWANOL ®EB (trademark of The Dow Chemical Company solvent are added.

The mixture is allowed to sit overnight and then is cast on steel sheets at a thickness of 0.20 mils±0.02. The composition is cured at 400° F. for 10 minutes. After 24 hours, the panels are given the following tests: wedge-bend test (ASTM D 3281-84) and MEK rub test described in Massingill et al., Vol. 65 *J. Coatings Tech.* at 65–71. The results are shown in Table 3.

TABLE 3

| Sample No. | PO Charge* | Curing Agent (% of solids) | Epoxy Resin (% of Solids) | Wedge Bend (mm) | MEK Rubs |
|---|---|---|---|---|---|
| 1 | 2 | 10 | 0 | 9 | 10 |
| 2 | 2 | 15 | 0 | 26 | 20 |
| 3 | 3 | 10 | 0 | 12 | 10 |
| 4 | 3 | 15 | 0 | 26 | 20 |
| 5 | 4 | 10 | 0 | 5 | 5 |
| 6 | 4 | 15 | 0 | 14 | 10+ |
| 7 | 4 | 10 | 55 | 18 | 15+ |
| 8 | 5 | 15 | 0 | 36 | 5 |
| 9 | 5 | 5 | 75 | 13 | 15+ |
| 10 | 5 | 10 | 75 | 21 | 10+ |
| 11 | 5 | 15 | 75 | 29 | 15+ |
| 12 | 5 | 5 | 50 | 4— | 15+ |
| 13 | 5 | 10 | 50 | 12 | 15— |
| 14 | 5 | 15 | 50 | 21 | 15+ |
| A | 0 | 5 | 100 | 19 | 10 |
| B | 0 | 10 | 100 | 29 | 20 |
| C | 0 | 15 | 100 | 38 | 25+ |

*"PO Charge" is the equivalents of propylene oxide per equivalent of hydroxyl group in the phenolic resin.

Example 5—Stable Aqueous Dispersion

The process of Example 2 is repeated using:
(a) 60 g of phenolic resin having a molecular weight of about 14,000, a hydroxyl content of about 5.52 percent, and a hydroxyl equivalent weight of about 308;
(b) 33.9 g of propylene oxide;
(c) 1.31 g of potassium t-butoxide;
(d) 40 g of anhydrous p-xylene.

The resulting graft copolymer has a hydroxyl content of 4.1 percent, a glass-transition temperature of 13° C., and a viscosity of 4500 cps at 150° C.

A 142 g quantity of the graft copolymer is dissolved in a solvent mixture containing 67 g DOWANOL EB solvent and 22 g n-butanol. A mixture of 23 g of methacrylic acid, 12.5 g of styrene and 3.3 g of benzoyl peroxide is added over a period of 3 hours while the reaction mixture is maintained at a temperature of 115° C. After 3 more hours of further reaction, the temperature is reduced to 50° C., and a mixture of 23.5 g dimethylethanolamine and 300 g deionized water is added. An additional 298 g deionized water is added. A stable water dispersion is formed and exhibits no phase separation after storage at room temperature for two years.

What is claimed is:

1. A graft copolymer comprising:
   (1) a phenolic resin which is the reaction product of at least one diglycidyl ether of a dihydric phenol and an excess of at least one dihydric phenol; and
   (2) about 5 to about 50 weight percent of pendant poly(alkylene oxide) chains linked to the phenolic resin, selected such that the graft copolymer has a solubility of no more than about 10 g/L in water.

2. The graft copolymer of claim 1 wherein the phenolic resin has a number average molecular weight of about 4000 to 50,000.

3. The graft copolymer of claim 1 wherein the pendant poly(alkylene oxide) chains contain on average more than 0 and less than 8 repeating units.

4. The graft copolymer of claim 1 wherein alkylene moieties in the poly(alkylene oxide) chains contain on average more than 2 and no more than about 6 carbon atoms.

5. A coating composition that comprises:
   (1) a graft copolymer of claim 1;
   (2) an epoxy resin or a curing agent or both; and
   (3) an organic solvent.

6. A coating composition of claim 5 which contains an epoxy resin.

7. A coating composition of claim 5 which contains a curing agent capable of reacting with the graft copolymer.

8. The graft copolymer of claim 1 wherein the graft copolymer contains about 10 to about 30 weight percent poly(alkylene oxide).

9. The graft copolymer of claim 1 wherein alkylene groups in the poly(alkylene oxide) do not contain the following pendant substituents: vinyl, alkoxide, aryloxide, and halogen moieties.

10. The graft copolymer of claim 1 wherein the dihydric phenol is any of the following: resorcinol, hydroquinone, 4,4'-dihydroxybiphenyl, bisphenol F, bisphenol A, bis-(4-hydroxyphenyl)sulphone, bis-(4-hydroxyphenyl)ketone, bis-(4-hydroxyphenyl)fluorene and alkyl- or halo-substituted variations thereof; and the diglycidyl ether of a dihydric phenol is a diglycidyl ether of any of those dihydric phenols.

11. The graft copolymer of claim 10 wherein the dihydric phenol is bisphenol A and the diglycidyl ether is a diglycidyl ether of bisphenol A.

12. The graft copolymer of claim 10 wherein the poly(alkylene oxide) is polymerized from one or more of the following monomers: ethylene oxide, propylene oxide, 1,2-butylene oxide, epichlorohydrin, cyclohexene oxide, or norborylene oxide.

13. The graft copolymer of claim 12 wherein the poly(alkylene oxide) is poly(propylene oxide), poly(1,2-butylene oxide) or a copolymer of propylene oxide and 1,2-butylene oxide.

14. The graft copolymer of claim 13 which contains about 10 to about 30 weight percent poly(alkylene oxide).

15. The graft copolymer of claim 14 wherein about 1 to about 50 percent of the original pendant hydroxyl groups on the phenolic resin are not grafted with a poly(alkylene oxide) chain.

16. The graft copolymer of claim 15 wherein about 10 to about 30 percent of the original pendant hydroxyl groups on the phenolic resin are not grafted with a poly(alkylene oxide) chain.

17. The graft copolymer of claim 15 which has a glass-transition temperature of about $-30°$ C. to about $60°$ C.

18. A coating composition that comprises:
   (1) a graft copolymer of claim 17;
   (2) an epoxy resin or a curing agent or both; and
   (3) an organic solvent.

19. A coating composition of claim 18 which contains an epoxy resin.

20. A coating composition of claim 18 which contains a curing agent capable of reacting with the graft copolymer.

* * * * *